US010768853B2

United States Patent
Jreij et al.

(10) Patent No.: US 10,768,853 B2
(45) Date of Patent: Sep. 8, 2020

(54) INFORMATION HANDLING SYSTEM WITH MEMORY FLUSH DURING SHUT DOWN

(71) Applicant: DELL PRODUCTS, LP, Round Rock, TX (US)

(72) Inventors: Elie A. Jreij, Pflugerville, TX (US); Anton Kucherov, Dudley, MA (US); Felix Shvaiger, Nashua, NH (US); Arieh Don, Newton, MA (US)

(73) Assignee: Dell Products, L.P., Round Rock, TX (US)

( * ) Notice: Subject to any disclaimer, the term of this patent is extended or adjusted under 35 U.S.C. 154(b) by 6 days.

(21) Appl. No.: 16/047,988

(22) Filed: Jul. 27, 2018

(65) Prior Publication Data

US 2020/0034072 A1    Jan. 30, 2020

(51) Int. Cl.
*G06F 3/06* (2006.01)
*G06F 9/54* (2006.01)
*G06F 11/30* (2006.01)
*G06F 9/4401* (2018.01)

(52) U.S. Cl.
CPC .......... *G06F 3/0656* (2013.01); *G06F 3/0619* (2013.01); *G06F 3/0689* (2013.01); *G06F 9/442* (2013.01); *G06F 9/542* (2013.01); *G06F 11/3006* (2013.01)

(58) Field of Classification Search
CPC .... G06F 3/0656; G06F 3/0619; G06F 3/0689; G06F 9/442; G06F 9/542; G06F 11/3006
See application file for complete search history.

(56) References Cited

U.S. PATENT DOCUMENTS

| | | | | |
|---|---|---|---|---|
| 9,223,662 | B2 * | 12/2015 | Flynn | G06F 11/1008 |
| 9,465,550 | B1 * | 10/2016 | Lippitt | G06F 3/0613 |
| 9,760,430 | B2 * | 9/2017 | Farhan | G06F 11/0793 |
| 9,891,846 | B2 | 2/2018 | Hsu et al. | |
| 9,996,291 | B1 * | 6/2018 | Izhar | G06F 3/0685 |
| 2005/0188239 | A1 * | 8/2005 | Golasky | G06F 11/201 |
| | | | | 714/2 |
| 2010/0042773 | A1 | 2/2010 | Yeh | |
| 2012/0042095 | A1 * | 2/2012 | Kotha | H04L 12/56 |
| | | | | 709/233 |
| 2016/0292078 | A1 * | 10/2016 | Hsu | G06F 12/0891 |

* cited by examiner

*Primary Examiner* — Ramon A. Mercado
(74) *Attorney, Agent, or Firm* — Larson Newman, LLP

(57) ABSTRACT

An information handling system includes a server and a storage array. The server includes a memory buffer that stores data for an operating system executed within the server. The server detects that a shut down of the server has been initiated, and provides a signal indicating that the shut down has been initiated. The storage array receives the signal from the server, and increases a service level objective of write commands from the server in response to the signal being received.

20 Claims, 5 Drawing Sheets

INFORMATION HANDLING SYSTEM WITH MEMORY FLUSH DURING SHUT DOWN

FIELD OF THE DISCLOSURE

The present disclosure generally relates to information handling systems, and more particularly relates to an information handling system with memory flush during shut down.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a server and a storage array. The server includes a memory buffer that may store data for an operating system executed within the server. The server may detect that a shut down of the server has been initiated, and provides a signal indicating that the shut down has been initiated. The storage array receives the signal from the server, and increases a service level objective of write commands from the server in response to the signal being received.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
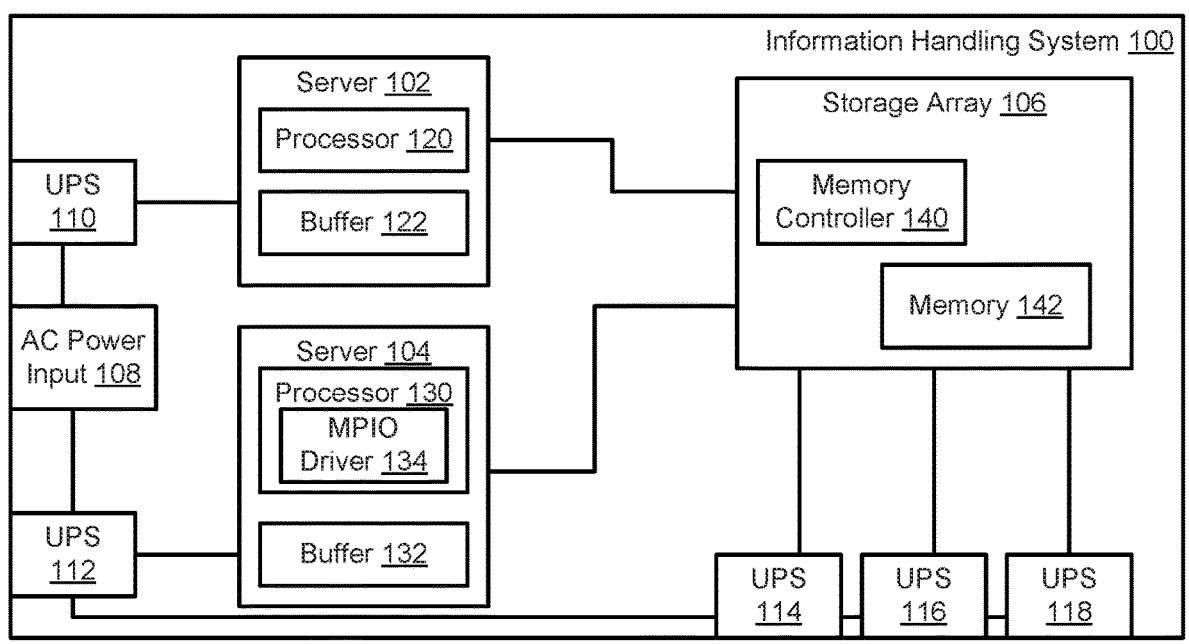
FIG. 1 is a block diagram of an information handling system according to at least one embodiment of the disclosure.

FIG. 1 illustrates an information handling system 100 according to at least one embodiment of the disclosure. The information handling system 100 includes servers 102 and 104, a storage array 106, an alternating current (AC) power input 108, and multiple uninterruptible power supply (UPS) systems 110, 112, 114, 116, and 118. The server 102 includes a processor 120 and a memory buffer 122. One of ordinary skill in the art will recognize that while the server 102 can include multiple additional components, for brevity and clarity only processor 102 and memory buffer 122 have been shown and discussed herein. The server 104 includes a processor 130 and a memory buffer 132. One of ordinary skill in the art will recognize that while the server 104 can include multiple additional components, for brevity and clarity only processor 130 and memory buffer 132 have been shown and discussed herein. The storage array 106 includes a memory controller 140 and memory 142. One of ordinary skill in the art will recognize that while the storage array 106 can include multiple additional components, for brevity and clarity only memory controller 140 and memory 142 have been shown and discussed herein. The information handling system 100 can include additional servers, over servers 102 and 104, without varying from the scope of the current disclosure.

The AC power input 110 can receive power from an AC power source that is external to the information handling system 100, and the AC power input 108 can provide power to each of the USP systems 110, 112, 114, 116, and 118. The UPS systems 110, 112, 114, 116, and 118 can utilize the power from the AC power input 108 to provide power to the servers 102 and 104 and to the storage array 106. The UPS systems 110, 112, 114, 116, and 118 can also maintain backup power for the device connected to the UPS systems 110, 112, 114, 116, and 118. For example, the UPS system 110 can provide backup power to the server 102, the UPS system 112 can provide backup power to the server 104, and each of the UPS systems 114, 116, and 118 can provide backup power to the storage array 106. In an embodiment, the storage array 106 is provided with more UPS systems than the servers to ensure that the storage array 106 does not lose power.

During operation of the information handling system 100, each of the processors 120 and 130 can execute their own operating system. The processors 120 and 130 can read data from the memory 142 of the storage array 106 via the memory controller 140, and can perform different operations on the read data. While the operations are being performed, the processor 120 can store the data in buffer 122, and the processor 130 can store the data in buffer 132. A user can configure the information handling system 100 so that the storage array 106 has different service level objectives (SLOs) for the servers 102 and 104. In an embodiment, the storage array 106 can utilize the SLO to set a response time for responses to a server, to set a bandwidth provided to a server, to set a central processor unit (CPU) quota within the storage array 106 for write commands from a server, or the like. A user can determine a level of importance for each of the servers 102 and 104, such that the servers 102 and 104 can execute different priority applications, and the user can set the SLO level for the servers 102 and 104 accordingly. For example, the user can assign a higher SLO level to server 102 and a lower SLO level to server 104. In an embodiment, there can be multiple SLO levels, such as highest or diamond priority, second highest or gold priority, third highest or silver priority, and lowest or bronze priority. One of ordinary skill in the art would recognize that the number a SLO level can be more or less than those stated above without varying from the scope of this disclosure. In an embodiment, more than one server could be assigned to the same SLO level.

While the servers 102 and 104 are operating based on assigned SLO levels stated above, reads from and write to the memory 142 of the storage array 106 can be slower for server 104 based on the server 104 having a lower SLO level than server 102. The operation of the processors 120 and 130 can be substantially the same. Therefore, for brevity and clarity, the description will be given only with respect to processor 130.

The processor 130 can implement a multi-pathing input/output (MPIO) driver 134 that can wake-up periodically to check a power status for the server 104. For example, the MPIO driver 134 within processor 130 can check to determine whether an amount of power within the UPS 112 is above a threshold amount, and if so, the MPIO driver 134 of processor 130 can go back to sleep without any other action. However, if the MPIO driver 134 of processor 130 detects that the amount of power in the UPS 112 is below the threshold amount, the MPIO driver 134 of processor 130 can determine that shut down of the server 104 should be performed before the server 104 loses power. The MPIO driver 134 of processor 130 can then communicate with the operating system of the processor 130 to initiated shut down of the server 104. The shut down of the server 104 can result in the data stored in buffer 132 being written to memory 142 so that the data is not lost when the server no longer has power. In an embodiment, the buffer 132 can be a volatile memory, such that any data stored in the buffer 132 is lost when power is no longer provided to the buffer 132.

The MPIO driver 134 of processor 130 can also provide a signal to the storage array 106, via memory controller 140, that of the coming shut down of server 104. In an embodiment, the signal can be a vendor unique small computer system interface (SCSI) command or the like. Previously, the SLO level of the server 104 may have prevented all of the data to be transferred from buffer 132 to the memory 142 before the server 104 is shut down, which could impact the server 104 when the server 104 comes back online. Thus, as disclosed herein, the information handling system 100 can for a short period improve flushing data from buffer 132 to the storage array 106 by increasing the SLO level of the server 104.

When the storage array 106 receives the signal indicating shut down of the server 104, the storage array 106 can increase the SLO level of write commands from server 104. In an embodiment, the increase of the SLO level for server 104 can be to a level above the SLO level of server 102. In this embodiment, the increase of the SLO level can cause the memory controller 140 of the storage array 106 to give higher priority to write commands from the server 104 as compared to write commands from the server 102. The increased SLO level for server 104 can also reduce response time for responses to the server 104, increase a bandwidth provided to the server 104, dedicate more CPU cycles within the memory controller 140 of the storage array 106 for write commands from the server 104, or the like. In an embodiment, the memory controller 140 can identify the source, such as from processor 120 or 130, of each input/output (I/O) stream received at the storage array 106. In this embodiment, the memory controller 140 increase the SLO level, such as reducing response time and increase bandwidth, for all I/O streams associated with server 104.

In an embodiment, the memory 142 can be divided into different storage groups, which can be sections or partitions of memory 142 grouped together and assigned to a particular application executed on a processor, such as processor 130. In this embodiment, the storage array 106 can increase the SLO level for all commands associated with a particular storage group associated with an application executed on the processor 130 of server 104. In an embodiment, the storage array 106 can limit the increase of the SLO level for server 104 to a predetermined amount of time to prevent a user from utilizing the MPIO to increase the SLO level of the server 104 even when the server 104 is not being shut down. In an embodiment, the predetermined amount of time can be an amount greater than the time for the server 104 to completely shut down, such as 10 minutes, 15 minutes, 20 minutes, or the like.

The memory controller 140 of the storage array 106 can determine when the predetermined amount of time has expired, and then can return the SLO level for the server 104 to the previously assigned SLO level before the reception of the signal indicating shut down of the server 104. In an embodiment, the change of the SLO level back to the previous level can ensure that the SLO level the server 104 is not still increase when the server 104 is back online. In an embodiment, the MPIO can also provide the signal indicating shut down of the server 104 in response to a reboot operation of the server 104, such that the reboot process can be executed quicker based on the increased bandwidth for I/O commands. In an embodiment, the MPIO driver 134 can also provide the signal indicating shut down of server 104 in response to a hardware malfunction, such as component overheating, within server 104 or any other event that may cause the server 104 to be shut down.

Figure 2:
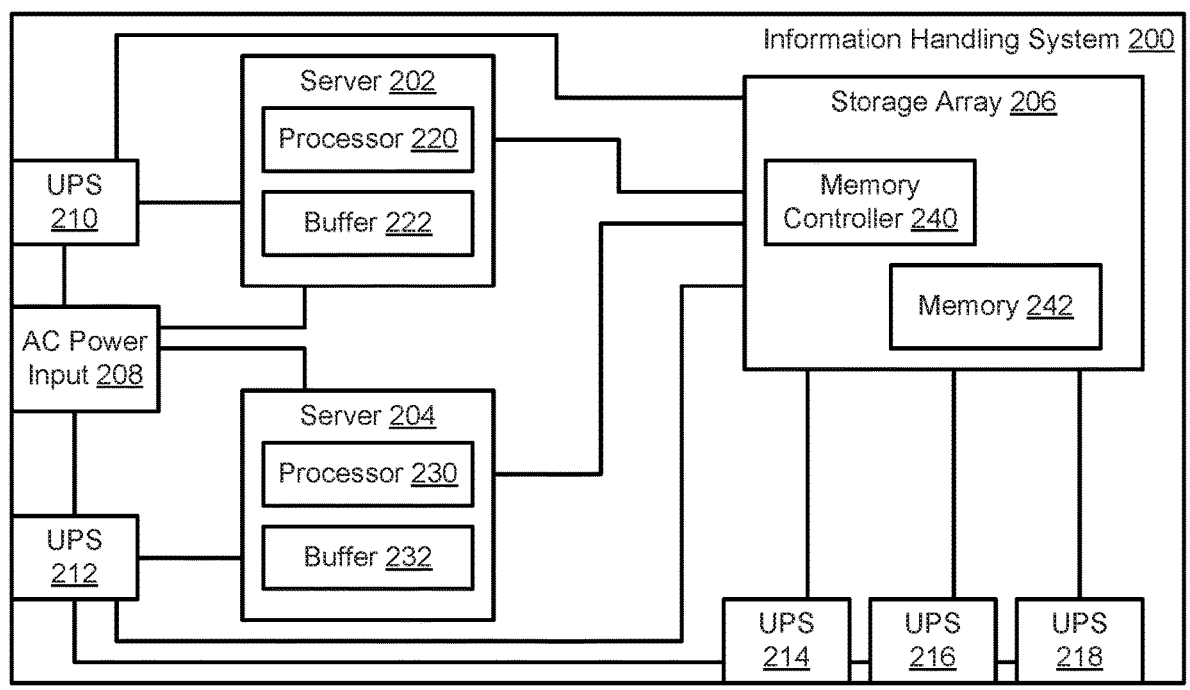
FIG. 2 is a block diagram of another embodiment of the information handling system according to at least one embodiment of the disclosure.

FIG. 2 illustrates an information handling system 200 according to at least one embodiment of the disclosure. The information handling system 200 includes servers 202 and 204, a storage array 206, an AC power input 208, and multiple UPS systems 210, 212, 214, 216, and 218. The server 202 includes a processor 220 and a memory buffer 222. One of ordinary skill in the art will recognize that while the server 202 can include multiple additional components, for brevity and clarity only processor 202 and memory buffer 222 have been shown and discussed herein. The server 204 includes a processor 230 and a memory buffer 232. One of ordinary skill in the art will recognize that while the server 204 can include multiple additional components, for brevity and clarity only processor 230 and memory buffer 232 have been shown and discussed herein. The storage array 206 includes a memory controller 240 and memory 242. One of ordinary skill in the art will recognize that while the storage array 206 can include multiple additional components, for brevity and clarity only memory controller 240 and memory 242 have been shown and discussed herein. The information handling system 200 can include additional servers, over servers 202 and 204, without varying from the scope of the current disclosure. The information handling system 200 can be similar to the information handling system 100. However, the storage array 206 can have access to the UPS systems 210, 212, 214, 216, and 218.

In this embodiment, the hosts on processors 220 and 230 can register with the memory controller 240 of storage array 206. During this registration of the hosts, the storage array 206 can associate server 202 with UPS 210 and server 204 with UPS 212. The storage array 206 can also determine all communication paths and resources associated with each server 202 and 204. The storage array 206 can then monitor the AC power input 208 and the UPS systems 210 and 212. When the storage array 206 determines that the AC power input 208 no longer is providing the information handling system 200 with power, the storage array 206 can monitor an amount of power remaining in the UPS systems 210 and 212. If the amount of power remaining in a UPS system, such as UPS system 210, drops below a threshold level, the storage array 206 can increase the SLO level for the server 202, and all of the communication paths and resources associated with server 202. In an embodiment, the increase in the SLO level can be substantially similar to the process described above with respect to FIG. 1. In an embodiment, the storage array 206 can maintain the increased SLO level for the server 202 associated with UPS system 210 until the amount of power remaining in UPS system 210 is above the threshold amount.

Figure 3:
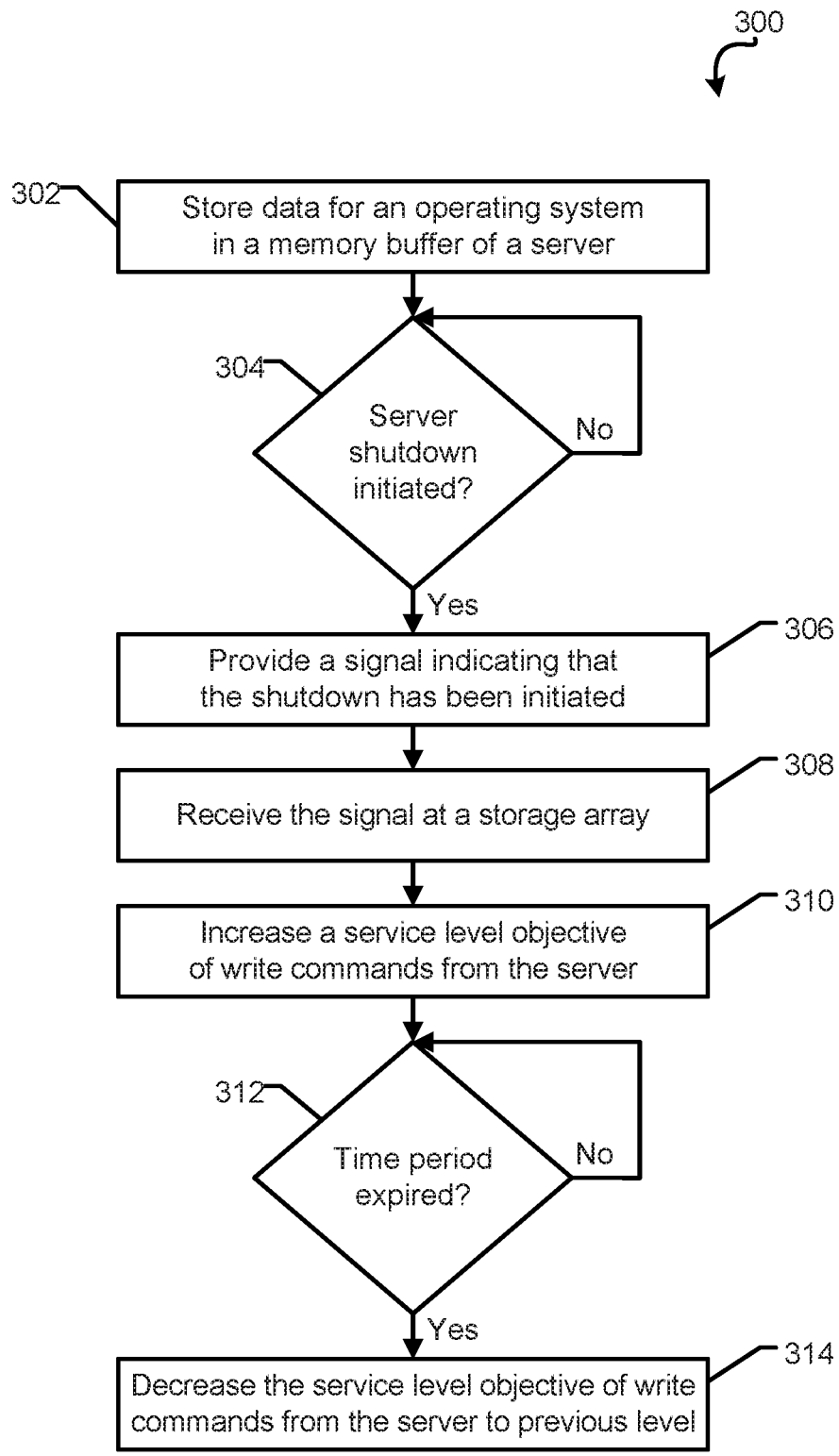
FIG. 3 is a flow diagram of a method for avoiding data loss when a server is shutting down according to at least one embodiment of the present disclosure.

FIG. 3 illustrates a flow diagram of a method 300 for avoiding data loss when a server is shutting down according to at least one embodiment of the present disclosure. At block 302, data for an operating system executed on a processor of a server is stored in a memory buffer. At block 304, a determination is made whether shut down of the server has been initiated. When shut down of the server has been initiated, a signal indicating that the shut down has been initiated is provided by the server at block 306. In an embodiment, the signal can be a vendor unique small computer system interface (SCSI) command or the like. At block 308, the, the signal from the server is received at a storage array.

At block 310, a SLO level of write commands from the server is increased in response to the signal being received. In an embodiment, the increased SLO level for server reduce response time for responses to the server, increase a bandwidth provided to the server, dedicate more CPU cycles within a memory controller of the storage array for write commands from the server, or the like. At block 312, a determination is made whether a predetermined amount of time has expired. In an embodiment, the predetermined amount of time is an amount of time for the SLO level to be increased. When the predetermined amount of time has expired, the SLO level is decreased to a level prior to the signal being received.

Figure 4:
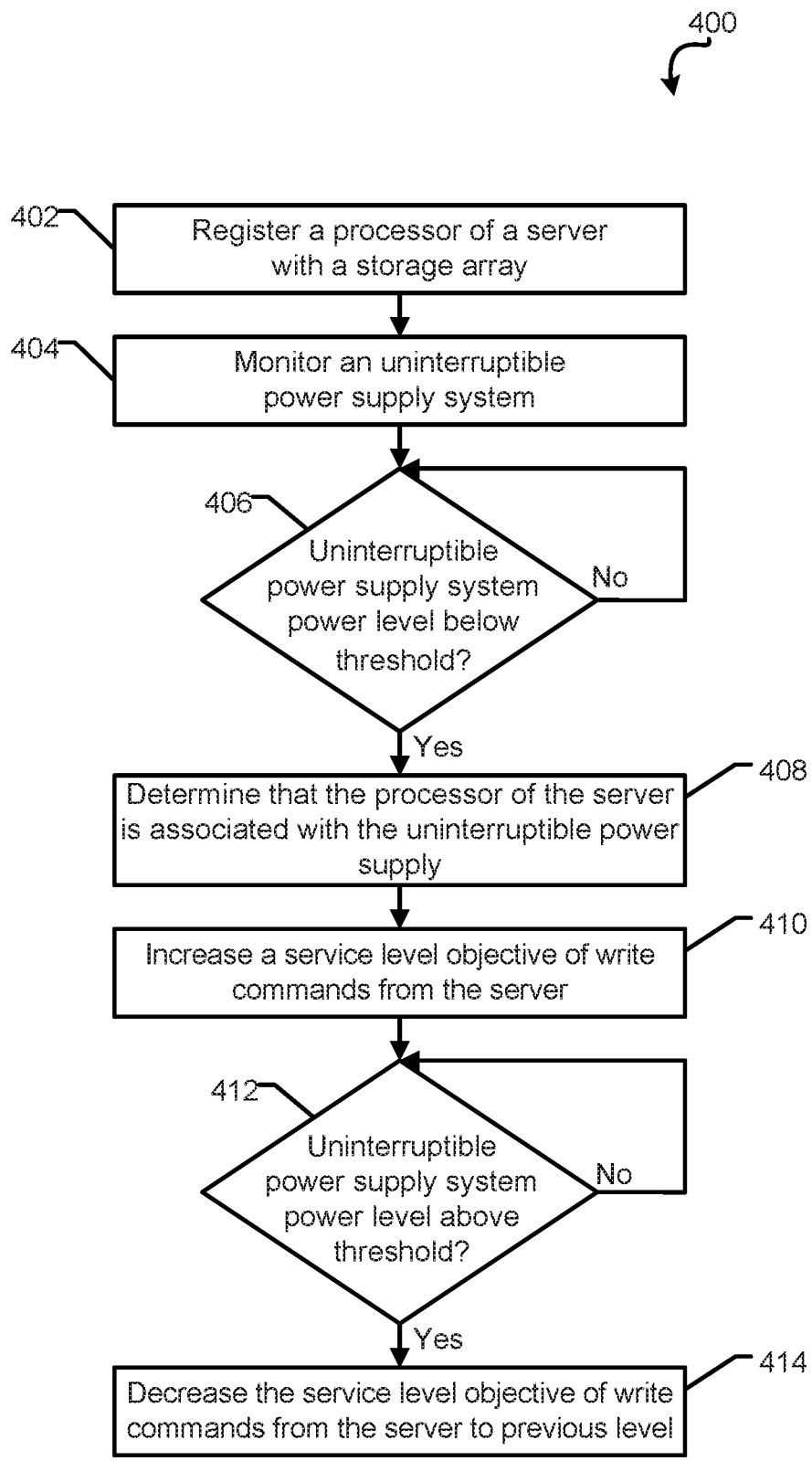
FIG. 4 is a flow diagram of another method for avoiding data loss when a server is shutting down according to at least one embodiment of the present disclosure.

FIG. 4 illustrates a flow diagram of a method 400 for avoiding data loss when a server is shutting down according to at least one embodiment of the present disclosure. At block 402, a processor of a server is registered with a storage array. An UPS system within the information handling system is monitor at block 404. At block 406, a determination is made whether an amount of power remaining in the UPS system is below a threshold level. In an embodiment, the threshold level can be an amount of power to enable shut down of a server connected to the UPS system.

When the amount of power remaining in the UPS system is below the threshold level, a determination is made that the processor of the server is associated with the UPS system at block 408. At block 410, the SLO level for the write commands from the processor of the server is increased in response to the amount of power remaining in the uninterruptible power supply system being below the threshold level. In an embodiment, the increased SLO level for server reduce response time for responses to the server, increase a bandwidth provided to the server, dedicate more CPU cycles within a memory controller of the storage array for write commands from the server, or the like. At block 412, a determination is made whether the amount of power remaining in the uninterruptible power supply system is above the threshold level. When the amount of power remaining in the uninterruptible power supply system being above the threshold level, the SLO level for the server is decreased to a level prior to the change in the SLO level at block 414.

Figure 5:
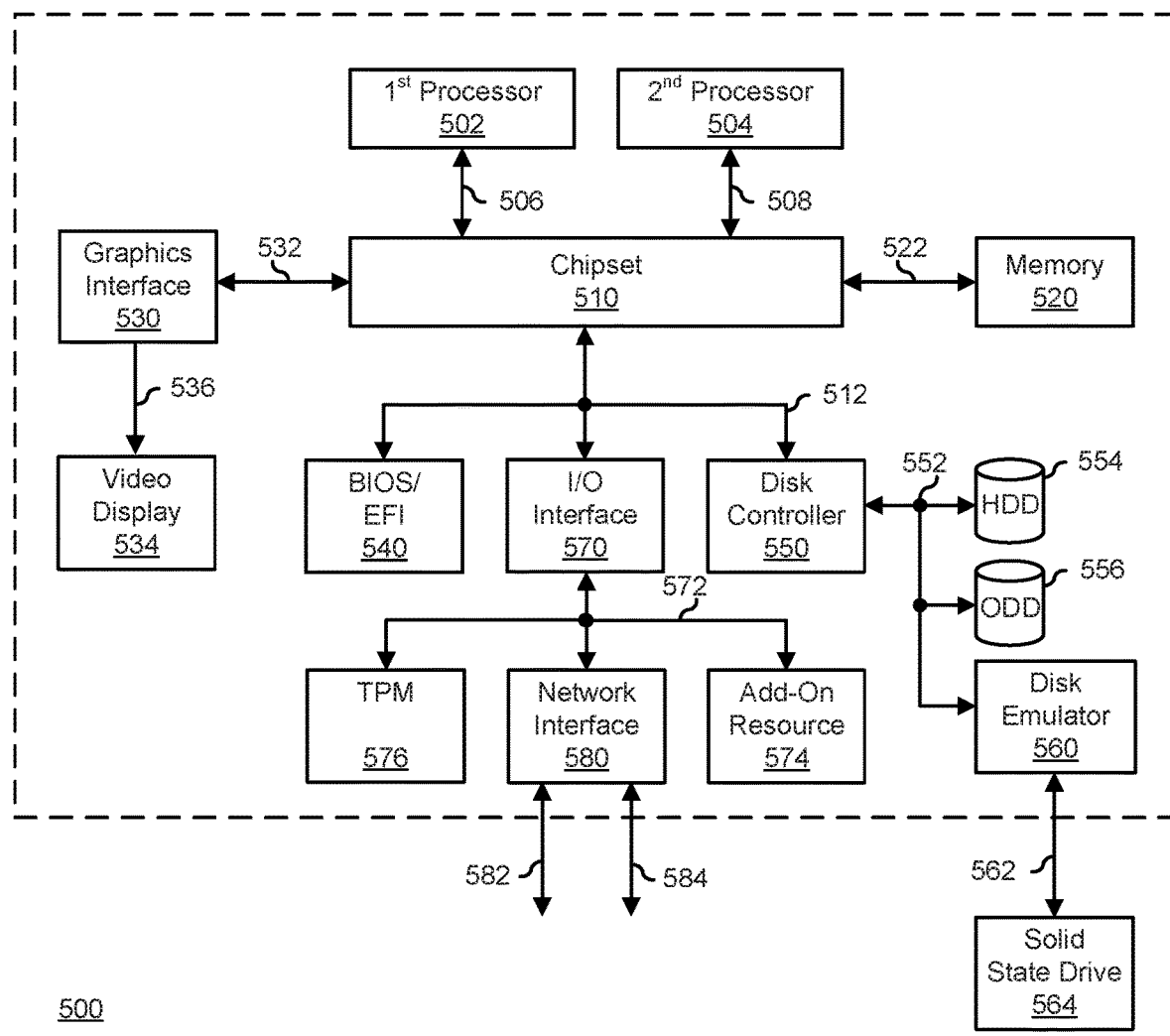
FIG. 5 is a block diagram of a general information handling system according to at least one embodiment of the disclosure.

FIG. 5 illustrates a generalized embodiment of information handling system 500, such as information handling system 100 and/or servers 102 and 104 of FIG. 1, information handling system 200 and/or servers 202 and 204 of FIG. 2, or the like. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a plurality of uninterruptible power supply systems to provide power to a plurality of servers, the uninterruptible power supply systems including first and second uninterruptible power supply systems;
a first server of the servers including a memory buffer to store data for an operating system executed within the first server, and a first processor, wherein the first server is associated with the first uninterruptible power supply system, the first processor to detect that an amount of power remaining in the first uninterruptible power supply system is below a threshold level, and to provide a signal indicating that the amount of power remaining in the first uninterruptible power supply system is below a threshold level;
a second server of the servers including a memory buffer to store data for an operating system executed within the first server, and a second processor, wherein the first server is associated with the second uninterruptible power supply system, the second processor to detect that an amount of power remaining in the second uninterruptible power supply system is above threshold level, and in response to the amount of power remaining in the second uninterruptible power supply system being above the threshold level, the second processor to enter a sleep mode; and
a storage array to communicate with the first server, the storage array to receive the signal from the first server, and in response to the signal being received, the storage array to: increase a first service level objective of write commands from the first server to a level above a second service level objective of write commands from a second server.

2. The information handling system of claim 1, wherein the first service level objective is increased for a predetermined amount of time.

3. The information handling system of claim 2, wherein the storage array to decrease the first service level objective to a level prior to the signal being received after the predetermined amount of time as been reached.

4. The information handling system of claim 1, wherein the increase of the first service level objective includes reduction of response time for the first server, increase bandwidth for the first server, and increase central processing unit quota for the write commands from the first server.

5. The information handling system of claim 1, wherein the first server includes a multiple-pathing input/output driver to check a power state of the first server at a recurring interval.

6. The information handling system of claim 1, wherein the signal is a vendor unit small computer system interface command.

7. The information handling system of claim 1, the first processor further to detect that a shut down of the first server has been initiated, wherein the shut down of the first server is in response to a power loss in the first server.

8. The information handling system of claim 1, the first processor further to detect that a shut down of the first server has been initiated, wherein the shut down of the first server is in response to a reboot of the first server.

9. A method comprising:
storing, in a memory buffer of a first server, data for an operating system executed within the first server;
storing, in a memory buffer of a second server, data for an operating system executed within the second server;
detecting, by the first processor, that an amount of power remaining in a first uninterruptible power supply system is below a threshold level, wherein the first uninterruptible power supply system is associated with the first server;
providing, by the first processor, a signal indicating that the amount of power remaining in the first uninterruptible power supply system is below the threshold level;
detecting, by the second processor, that an amount of power remaining in a second uninterruptible power supply system is above the threshold level, wherein the second uninterruptible power supply system is associated with the second server;
in response to the amount of power remaining in the second uninterruptible power supply system being above the threshold level, entering, by the second processor, a sleep mode;
receiving, at a storage array, the signal from the first server; and
in response to the signal being received:
increasing, by the storage array, a first service level objective of write commands from the first server to a level above a second service level objective of write commands from the second server.

10. The method of claim 9, wherein the first service level objective is increased for a predetermined amount of time.

11. The method of claim 10, further comprising:
decreasing, by the storage array, the first service level objective to a level prior to the signal being received after the predetermined amount of time as been reached.

12. The method of claim 9, wherein the increase of the first service level objective includes reduction of response time for the first server increase bandwidth for the first server, and increase central processing unit quota for the write commands from the first server.

13. The method of claim 9, further comprising:
checking, by a multiple-pathing input/output driver of the first server, a power state of the first server at a recurring interval.

14. The method of claim 9, further comprising: detecting, by the first processor, that a shut down of the first server has been initiated, wherein the first signal is a vendor unit small computer system interface command.

15. The method of claim 9, further comprising: detecting, by the first processor, that a shut down of the first server has been initiated, wherein the shut down of the first server is in response to a power loss in the first server.

16. A method comprising:
registering a first processor of a first server with a storage array, wherein the first server and the storage array are located within an information handling system, wherein the registration of the first processor includes associating the first server with a first uninterruptible power supply system;
registering a second processor of a second server with the storage array, wherein the second server is located within the information handling system, wherein the registration of the second processor includes associating the second server with a second uninterruptible power supply system;
monitoring the first and second uninterruptible power supply systems within the information handling system;
detecting, by the second processor, that an amount of power remaining in the second uninterruptible power supply system is above a threshold level;

in response to the amount of power remaining in the second uninterruptible power supply system being above the threshold level, entering, by the second processor, a sleep mode;

detecting, by the first processor, that an amount of power remaining in the first uninterruptible power supply system is below the threshold level; and in response to the amount of power remaining in the first uninterruptible power supply system being below the threshold level, providing, by the first processor, a signal to the storage array; and in response to the storage array receiving the signal:
increasing, by the storage array, a service level objective of write commands from the first processor of the first server
to a level above a second service level objective of write commands from the second processor of the second server.

17. The method of claim 16, further comprising:
detecting that the amount of power remaining in the first uninterruptible power supply system is above the threshold level; and
decreasing, by the storage array, the first service level objective to a level prior in response to the amount of power remaining in the first uninterruptible power supply system being above the threshold level.

18. The method of claim 16, further comprising:
determining resources within the storage array associated with the first processor of the first server; and
increasing the first service level objective for the resources associated with the first processor of the first server.

19. The method of claim 16, wherein the increase of the first service level objective includes reduction of response time for the first server, increase bandwidth for the first server, and increase central processing unit quota for the write commands from the first server.

20. The method of claim 16, wherein the signal is a vendor unit small computer system interface command.

\* \* \* \* \*